(12) United States Patent
Huang et al.

(10) Patent No.: US 8,077,086 B2
(45) Date of Patent: Dec. 13, 2011

(54) METHODS AND APPARATUS FOR OBTAINING GNSS TIME IN A GNSS RECEIVER

(75) Inventors: Kung-Shuan Huang, Changhua County (TW); Hsien-Chang Liu, Nantou County (TW); An-Bang Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/050,965

(22) Filed: Mar. 18, 2011

(65) Prior Publication Data

US 2011/0163915 A1 Jul. 7, 2011

Related U.S. Application Data

(63) Continuation of application No. 12/446,754, filed as application No. PCT/CN2008/073848 on Dec. 30, 2008, now Pat. No. 7,936,303, and a continuation-in-part of application No. 11/850,684, filed on Sep. 6, 2007, now Pat. No. 7,629,924.

(51) Int. Cl.
*G01S 19/23* (2010.01)
(52) U.S. Cl. .................................. 342/357.62
(58) Field of Classification Search .............. 342/357.62
See application file for complete search history.

(56) References Cited

U.S. PATENT DOCUMENTS

| | | | |
|---|---|---|---|
| 6,075,987 A | 6/2000 | Camp, Jr. | |
| 6,138,074 A | 10/2000 | Gower | |
| 6,662,107 B2 | 12/2003 | Gronemeyer | |
| 6,778,136 B2 | 8/2004 | Gronemeyer | |
| 6,788,655 B1 | 9/2004 | Underbrink | |
| 6,907,346 B2 | 6/2005 | Teranishi | |
| 6,931,233 B1 | 8/2005 | Tso | |
| 6,985,811 B2 | 1/2006 | Gronemeyer | |
| 7,047,023 B1 | 5/2006 | Tso | |
| 7,190,307 B2 | 3/2007 | Gronemeyer | |
| 7,348,921 B2 | 3/2008 | Yu | |
| 7,466,265 B1 | 12/2008 | Huang | |
| 7,471,717 B2 | 12/2008 | Huang | |
| 7,579,984 B2 | 8/2009 | Wang | |
| 2006/0047459 A1 | 3/2006 | Underbrink | |
| 2006/0214847 A1 | 9/2006 | McBurney | |
| 2006/0234724 A1* | 10/2006 | Syrjarinne et al. | 455/456.1 |
| 2007/0268180 A1 | 11/2007 | Zhi | |
| 2008/0181347 A1 | 7/2008 | Nakamura | |
| 2009/0066567 A1 | 3/2009 | Huang | |

FOREIGN PATENT DOCUMENTS

| | | |
|---|---|---|
| CN | 101382589 A | 3/2009 |
| EP | 1 715 358 A1 | 10/2006 |
| TW | 200502566 A | 1/2005 |

* cited by examiner

*Primary Examiner* — Harry Liu
(74) *Attorney, Agent, or Firm* — Winston Hsu; Scott Margo

(57) ABSTRACT

A method and apparatus for obtaining Global navigation Satellite System (GNSS) time in a GNSS receiver are provided. The following steps are included: obtaining a time relationship between a first clock signal and the received GNSS time; obtaining a first clock value of a second clock signal and an first associated clock value of the first clock signal at a first time point; calculating a first GNSS time corresponding to the first clock value of the second clock signal according to the first associated clock value and the time relationship; obtaining a second clock value of the second clock signal and an second associated clock value of the first clock signal at a second time point; and calculating a second GNSS time corresponding to the second associated clock value, according to the first GNSS time, the first clock value and the second clock value of the second clock signal.

20 Claims, 8 Drawing Sheets ially, the resolution of the RTC is typically around several
METHODS AND APPARATUS FOR OBTAINING GNSS TIME IN A GNSS RECEIVER This application is a continuation application of U.S. application Ser. No. 12/446,754 filed Apr. 23, 2009, which is a continuation-in-part application of U.S. application Ser. No. 11/850,684 filed Sep. 6, 2007 which now is U.S. Pat. No. 7,629,924, which is incorporated herein by reference in its entirety.

FIELD OF INVENTION

The present invention relates to Global Navigation Satellite System (GNSS) receivers, and more particularly, to methods and apparatus for obtaining GNSS time in a GNSS receiver.

BACKGROUND OF THE INVENTION

One of the most important issues related to GNSS receivers is how to obtain GNSS time when a GNSS receiver enters a start up mode from a power-off mode. Typically, within the GNSS receiver, all components except a real time clock (RTC) are powered down in the power-off mode. According to the related art, a common way to get an initial GNSS time when the GNSS receiver is powered on is by reading the RTC time provided by the RTC as the Coordinated Universal Time, which is referred to as the UTC time, and by further converting the UTC time derived from the RTC time into a rough initial value of the GNSS time directly. Thus, some problems are introduced when implementing according to the related art. For example, UTC leap seconds are unknown. In addition, the resolution of the RTC is typically around several microseconds and the clock drift of the RTC is typically around several tens to several hundreds parts per million (PPM), causing the aforementioned initial value of the GNSS time to be unacceptable. Additionally, during time synchronization between the RTC time and real GNSS time, a time delay typically exists, causing the aforementioned initial value of the GNSS time to be inaccurate.

SUMMARY OF THE INVENTION

An exemplary embodiment of a method for obtaining Global Navigation Satellite System (GNSS) time in a GNSS receiver comprises: obtaining a time relationship between a first clock signal and the received GNSS time; obtaining a first clock value of a second clock signal and further obtaining an first associated clock value of the first clock signal at a first time point; calculating a first GNSS time corresponding to the first clock value of the second clock signal according to the first associated clock value of the first clock signal and the time relationship; obtaining a second clock value of the second clock signal and further obtaining an second associated clock value of the first clock signal at a second time point; and calculating a second GNSS time corresponding to the second associated clock value of the first clock signal at the second time point, according to the first GNSS time, the first clock value of the second clock signal, and second clock value of the second clock signal.

An exemplary embodiment of a method for obtaining Global navigation Satellite System (GNSS) time in a GNSS receiver, the method comprising: receiving a first frame number of a frame time clock of a cellular network at a first time point; obtaining a first GNSS time corresponding to the first frame number; receiving a second frame number of the frame time clock at a second time point; and obtaining a second GNSS time corresponding to an associated clock value of a clock signal of the GNSS receiver, according to the first GNSS time, the first frame number, and the second frame number.

An exemplary embodiment of an apparatus for obtaining GNSS time in a GNSS receiver comprises: at least one processing module arranged to receive a first frame number of a frame time clock of a cellular network at a first time point, obtain a first GNSS time corresponding to the first frame number, receive a second frame number of the frame time clock at a second time point, and obtain a second GNSS time corresponding to an associated clock value of a clock signal of the GNSS receiver according to the first GNSS time, the first frame number, and the second frame number.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
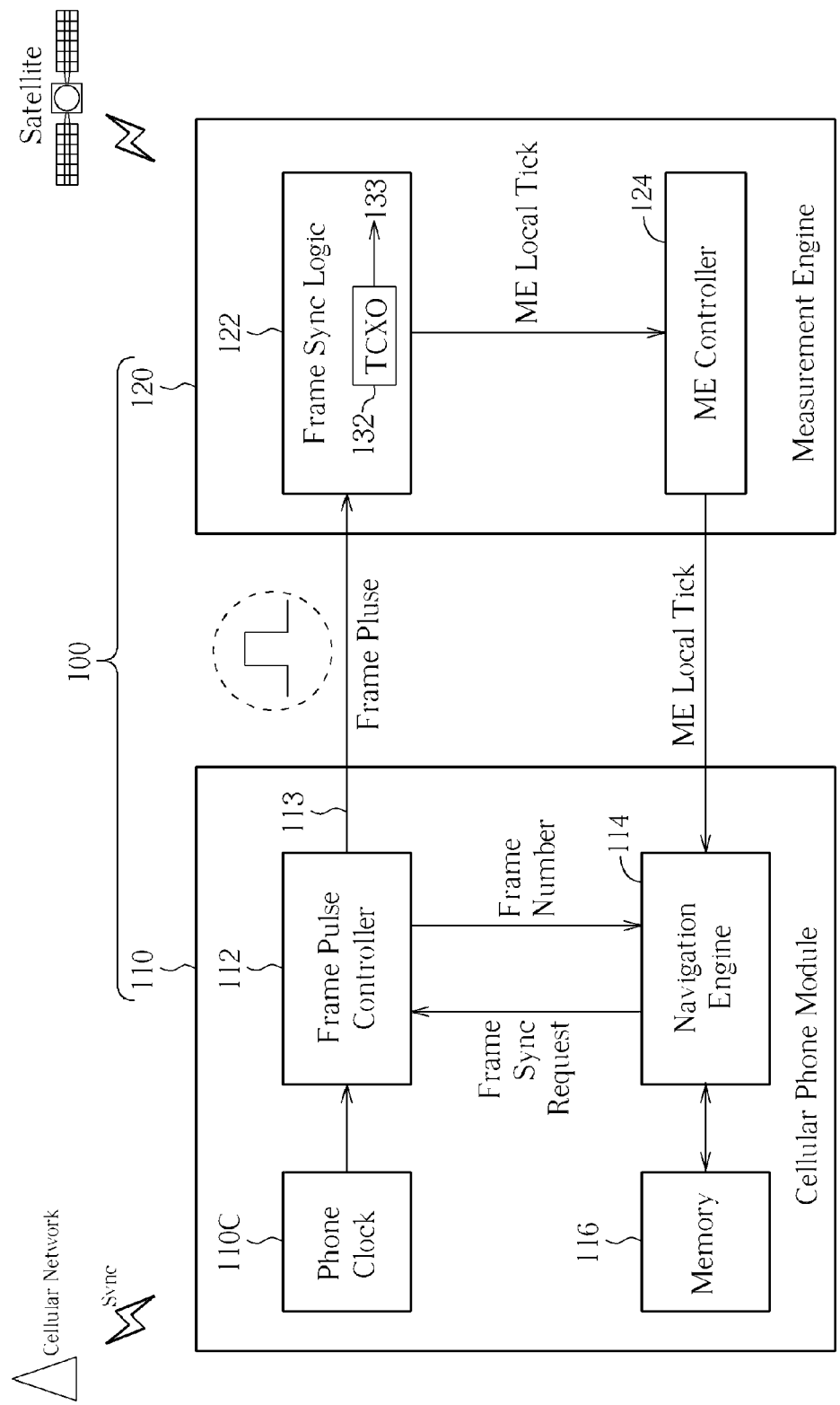
FIG. 1 is a diagram of an apparatus for obtaining Global Navigation Satellite System (GNSS) time in a GNSS receiver according to a first embodiment of the present invention.

Please refer to FIG. 1. FIG. 1 is a diagram of an apparatus 100 for obtaining GNSS time in a GNSS receiver according to a first embodiment of the present invention. The apparatus 100 comprises a cellular phone module 110 and a measurement engine (ME) 120. The cellular phone module 110 is arranged to perform cellular phone operations, while the measurement engine 120 is arranged to perform measurement such as synchronization measurement (e.g. frame synchronization measurement).

In practice, the apparatus 100 comprises at least one processing module such as a plurality of processing modules. For example, the plurality of processing modules comprises a frame pulse controller 112, a navigation engine (NE) 114, a frame synchronization logic circuit 122 (labeled "Frame Sync Logic"), and a measurement engine controller 124 (labeled "ME Controller"). This is for illustrative purposes only, and is not meant to be a limitation of the present invention. According to a variation of this embodiment, at least a portion of the processing modules can be integrated into the same module. According to another variation of this embodiment, the arrangement of at least a portion of the processing modules can be varied.

As shown in FIG. 1, the apparatus 100 comprises at lest one clock source such as a phone clock 110C and a temperature compensated crystal oscillator 132 (labeled "TCXO"), and further comprises a memory 116 such as a non-volatile memory, where the temperature compensated crystal oscillator 132 of this embodiment is embedded within the frame synchronization logic circuit 122 (labeled "Frame Sync Logic"). This is for illustrative purposes only, and is not meant to be a limitation of the present invention. According to a variation of this embodiment, the phone clock 110C is embedded within the frame pulse controller 112. According to another variation of this embodiment, the temperature compensated crystal oscillator 132 is implemented outside the frame synchronization logic circuit 122. According to another variation of this embodiment, the memory 116 is a volatile memory powered by an auxiliary power. According to another variation of this embodiment, the temperature compensated crystal oscillator 132 can be replaced by a low cost crystal oscillator.

Please note that the apparatus 100 may represent the GNSS receiver in one embodiment of the present invention. This is for illustrative purposes only, and is not meant to be a limitation of the present invention. According to another embodiment of the present invention, the apparatus 100 may represent a portion of the GNSS receiver, for example, a combination of at least a portion of the processing modules mentioned above. In another embodiment of the present invention, the apparatus 100 may comprise the GNSS receiver. For example, the apparatus 100 can be a multi-function device comprising the cellular phone function, the personal digital assistant (PDA) function, and the GNSS receiver function.

According to the first embodiment, the navigation engine 114 is implemented with a software module executed by a micro processing unit (MPU) in the cellular phone module 110. This is for illustrative purposes only, and is not meant to be a limitation of the present invention. According to a variation of this embodiment, the navigation engine 114 is implemented with a controller executing a hardware code embedded within the controller. According to another variation of this embodiment, the navigation engine 114 is implemented with a micro control unit (MCU) executing a firmware code.

The navigation engine 114 of the first embodiment is capable of performing detailed navigation operations according to processing results from a baseband circuit (not shown) within the measurement engine 120, where the baseband circuit is operated in a baseband time tick (TTick) whose frequency is typically around 10 MHz. In addition, the baseband time tick mentioned above is substantially a first clock signal 133 generated from the temperature compensated crystal oscillator 132 in the first embodiment. This is for illustrative purposes only, and is not meant to be a limitation of the present invention. According to a variation of this embodiment, the baseband time tick is generated from another oscillator instead of the temperature compensated crystal oscillator 132. According to another variation of this embodiment, the baseband circuit is implemented within another module instead of the measurement engine 120.

In the first embodiment, the frame pulse controller 112 converts a clock signal generated by the phone clock 110C into a synchronized version with respect to at least one wireless signal of one or more cellular networks, in order to generate a second clock signal 113, where the wireless signal is labeled "Sync" in FIG. 1 since it is received as a synchronization source. More particularly, under the control of the frame pulse controller 112, the second clock signal 113 is synchronized with a frame time clock of the cellular network shown in FIG. 1.

Please note that the second clock signal 113 carries pulses synchronized with the frame time clock. Therefore, the second clock signal 113 is substantially a time reference for implementation of the GNSS receiver. In this embodiment, one of the aforementioned at least one processing module is capable of controlling at least a portion of the GNSS receiver to enter a power saving mode for a time period and then recover from the power saving mode. For example, the measurement engine controller 124 controls the measurement engine 120 to enter a sleep mode during the time period (e.g. a sleep period) and then recover from the sleep mode. In another example, the measurement engine controller 124 controls the measurement engine 120 to power off during the time period (e.g. a power-off period) and then power on. After the time period, the apparatus 100 can rapidly obtain GNSS time according to the second clock signal 113.

The GNSS receiver always has to derive time information in order to process the satellite signal received from at least one satellite. After each time of position fix, the navigation engine 114 obtains time information by utilizing a baseband time tick value according to the time relationship between the baseband time tick and GNSS time, where the baseband time tick value of this embodiment is a clock value of the first clock signal 133, i.e. the clock value labeled "ME Local Tick" in FIG. 1. But when the GNSS receiver is waked up from a power off mode, the time relationship is no longer suitable; the GNSS receiver needs another source to get the GNSS time. The navigation engine 114 of this embodiment obtains time information corresponding to sufficient resolution and accuracy by adopting the frame pulse controller 112 and the frame synchronization logic circuit 122 (labeled "Frame Sync Logic"). The processing modules mentioned above (such as the frame pulse controller 112, the navigation engine 114, the frame synchronization logic circuit 122, and the ME controller 124) are capable of performing synchronization measurement to obtain a clock value of the second clock signal 113 and further obtain an associated clock value of the first clock signal 133, in order to obtain GNSS time.

In practice, a portion of the processing modules, such as the frame synchronization logic circuit 122, can be implemented with at least a portion of the time-latching logic circuit 150 disclosed in U.S. application Ser. No. 11/850,684. For example, the frame synchronization logic circuit 122 comprises the time-latching logic circuit 150. In another example, the frame synchronization logic circuit 122 comprises a portion of the time-latching logic circuit 150. As a result of a time-latching operation such as that disclosed in U.S. application Ser. No. 11/850,684, both the associated clock value of the first clock signal 133 and the clock value of the second clock signal 113 in the synchronization measurement share the highest resolution, i.e. the resolution of the clock signal whose frequency is higher than the other.

As mentioned above, the measurement engine 120 is arranged to perform measurement such as synchronization measurement (e.g. frame synchronization measurement), where synchronization between the second clock signal 113 and the first clock signal 133 may occur. This is for illustrative purposes only, and is not meant to be a limitation of the present invention. In general, the measurement mentioned above is not intended to cause synchronization between the second clock signal 113 and the first clock signal 133.

Please note that the processing modules mentioned above are arranged to obtain a clock value of the second clock signal 113 and further obtain an associated clock value of the first clock signal 133 in order to obtain at least one pulse relationship at a specific time point. For example, the processing modules obtain a clock value B1 of the second clock signal 113 and further obtain an associated clock value A1 of the first clock signal 133 in order to obtain a first pulse relationship at a first time point. In addition, the processing modules obtain a clock value B2 of the second clock signal 113 and further obtain an associated clock value A2 of the first clock signal 133 in order to obtain a second pulse relationship at a second time point. In particular, the processing modules of the first embodiment perform synchronization measurement at the first time point to obtain the first pulse relationship, and perform synchronization measurement at the second time point to obtain the second pulse relationship.

Figure 2:
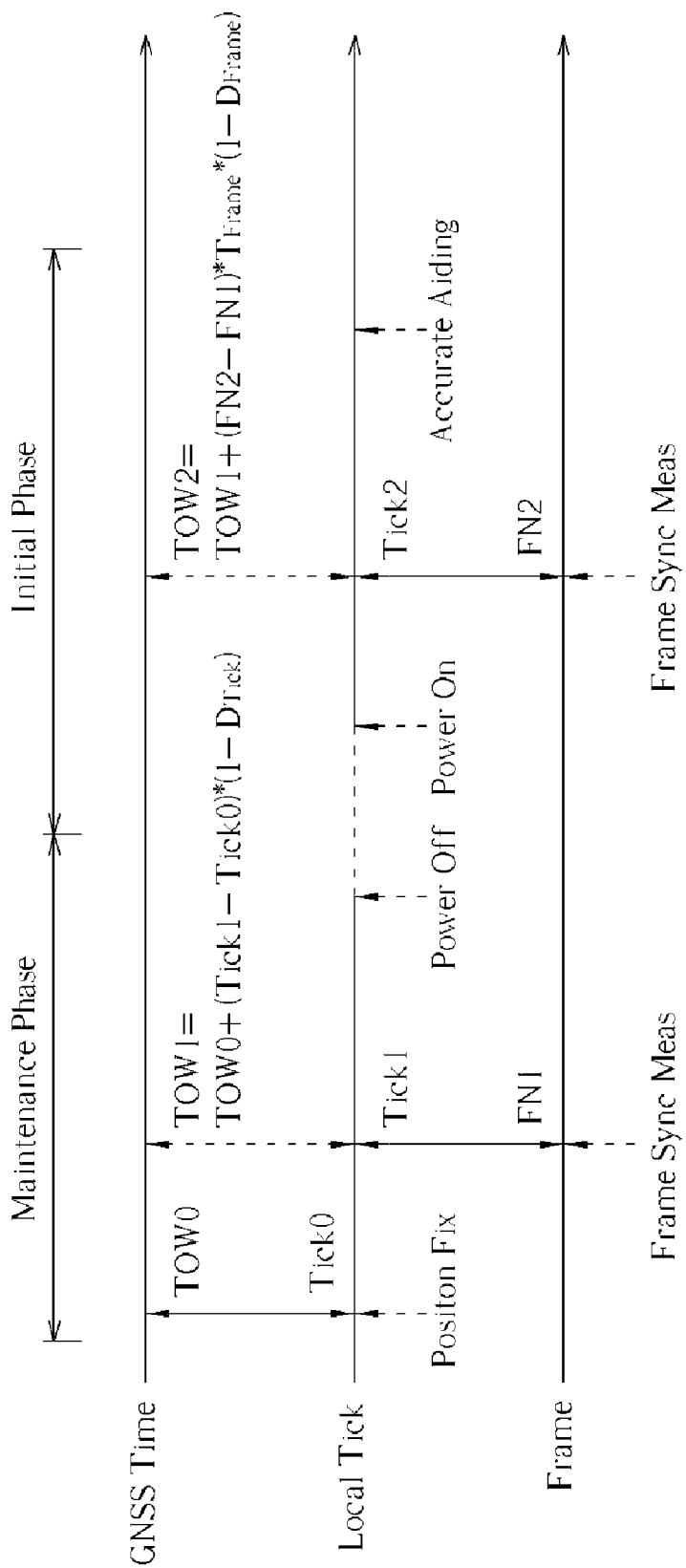
FIG. 2 illustrates a method for obtaining GNSS time in a GNSS receiver according to one embodiment of the present invention.

FIG. 2 illustrates a method for obtaining GNSS time in a GNSS receiver according to one embodiment of the present invention. The method shown in FIG. 2 can be implemented by utilizing the apparatus 100 shown in FIG. 1. Referring to the left portion of FIG. 2, after the GNSS receiver obtains a position fix, the processing modules of this embodiment obtains the time relationship between the first clock signal 133 (more particularly, the local tick mentioned above) and the GNSS time. In this embodiment, the time relationship between the first clock signal 133 and the GNSS time represents value mapping between the clock value of the first clock signal 133 and the GNSS time. An example of the time relationship is a set of values (TOW0, Tick0), where the value TOW0 represents a Time Of Week (TOW) value, and the value Tick0 represents a clock value of the first clock signal 133, such as a local tick value.

In a maintenance phase of this embodiment, the processing modules mentioned above obtain the clock value B1 of the second clock signal 113 and further obtain the associated clock value A1 of the first clock signal 133 in order to obtain the first pulse relationship at the first time point. More particularly, in this embodiment, the processing modules of this embodiment perform frame synchronization measurement at the first time point (labeled "Frame Sync Meas" at the bottom-left portion of FIG. 2) to obtain the first pulse relationship. Then, the processing modules calculate a GNSS time C1 corresponding to the clock value A1 according to the time relationship. In particular, the GNSS time C1 mentioned above is calculated by the navigation engine 114. In addition, after a position fix (e.g. a position fix of every few time units; or one of every few position fixes; or each position fix) is obtained, the processing modules of this embodiment are capable of updating the time relationship and further calculating/updating the latest local tick drift $D_{Tick}$ of the temperature compensated crystal oscillator 132 and the latest frame time clock drift $D_{Frame}$ of the frame time clock. As a result, the processing modules may store a set of values corresponding to the first time point into the memory 116.

More particularly, the navigation engine 114 stores the set of values into the memory 116. For example, according to a first implementation choice of this embodiment, the set of values comprise the latest local tick drift $D_{Tick}$, the latest frame time clock drift $D_{Frame}$, the clock value B1, the GNSS time C1 and maybe the clock value A1. This is for illustrative purposes only, and is not meant to be a limitation of the present invention. According to a second implementation choice of this embodiment, the set of values comprise the latest frame time clock drift $D_{Frame}$, the clock value B1, and the GNSS time C1.

In practice, the processing modules utilize the first clock signal 133 to measure arrival time of a pulse corresponding to the clock value B1 in order to obtain the clock value A1. More particularly, the clock value A1 represents a local tick value Tick1, the clock value B1 represents a frame number FN1, and the GNSS time C1 represents a TOW value TOW1. The processing modules utilize the first clock signal 133 to measure arrival time of a frame pulse corresponding to the frame number FN1 in order to obtain the local tick value Tick1. As a result, the navigation engine 114 calculates the TOW value TOW1 according to the following equation (1):

$$TOW1=TOW0+(Tick1-Tick0)*(1-D_{Tick}) \quad (1).$$

In addition, the navigation engine 114 calculates the frame time clock drift $D_{Frame}$ according to the following equation (2):

$$D_{Frame}=(\Delta FN-\Delta Tick*(1-D_{Tick}))/(\Delta Tick*(1-D_{Tick})) \quad (2);$$

where the $\Delta FN$ represents a difference ($FN_B-FN_A$) between two frame numbers $FN_B$ and $FN_A$, and the $\Delta Tick$ represents a difference ($Tick_B-Tick_A$) between two local tick values $Tick_B$ and $Tick_A$ respectively corresponding to the two frame numbers $FN_B$ and $FN_A$.

Referring to the right portion of FIG. 2, after the power-off period, the processing modules of this embodiment retrieve the set of previously stored values corresponding to the first time point (e.g. the latest local tick drift $D_{Tick}$, the latest frame time clock drift $D_{Frame}$, the clock value B1, the GNSS time C1 and maybe the clock value A1 in a situation where the first implementation choice is applied to this embodiment; or just the latest frame time clock drift $D_{Frame}$, the clock value B1, and the GNSS time C1 in a situation where the second implementation choice is applied to this embodiment), and utilize at least some of the set of previously stored values to obtain GNSS time.

In an initial phase of this embodiment, the processing modules mentioned above obtain the clock value B2 of the second clock signal 113 and further obtain the associated clock value A2 of the first clock signal 133 in order to obtain the second pulse relationship at the second time point. More particularly, the processing modules perform frame synchronization measurement at the second time point (labeled "Frame Sync Meas" at the bottom-right portion of FIG. 2) to obtain the second pulse relationship, and calculate a GNSS time C2 corresponding to the clock value A2 according to the GNSS time C1, the clock value B1, the clock value B2, and the latest frame time clock drift $D_{Frame}$.

In practice, the processing modules utilize the first clock signal 133 to measure arrival time of a pulse corresponding to the clock value B2 in order to obtain the clock value A2. More particularly, the clock value A2 represents a local tick value Tick2, the clock value B2 represents a frame number FN2, and the GNSS time C2 represents a TOW value TOW2. The processing modules utilize the first clock signal 133 to measure arrival time of a frame pulse corresponding to the frame number FN2 in order to obtain the local tick value Tick2. As a result, the navigation engine 114 calculates the GNSS time C2 (i.e. the TOW value TOW2 in this embodiment) according to the frame time clock drift $D_{Frame}$, the GNSS time C1 (i.e. the TOW value TOW1 in this embodiment), the frame number FN1, and the frame number FN2. In this embodiment, the navigation engine 114 calculates the GNSS time C2 (e.g. the TOW value TOW2) according to the following equations (3) or (4):

$$C2=C1+(B2-B1)*T_{Frame}*(1-D_{Frame}) \quad (3); \text{ or}$$

$$TOW2=TOW1+(FN2-FN1)*T_{Frame}*(1-D_{Frame}) \quad (4);$$

where the $T_{Frame}$ represents a length of a frame cycle of the frame time clock.

Figure 3:
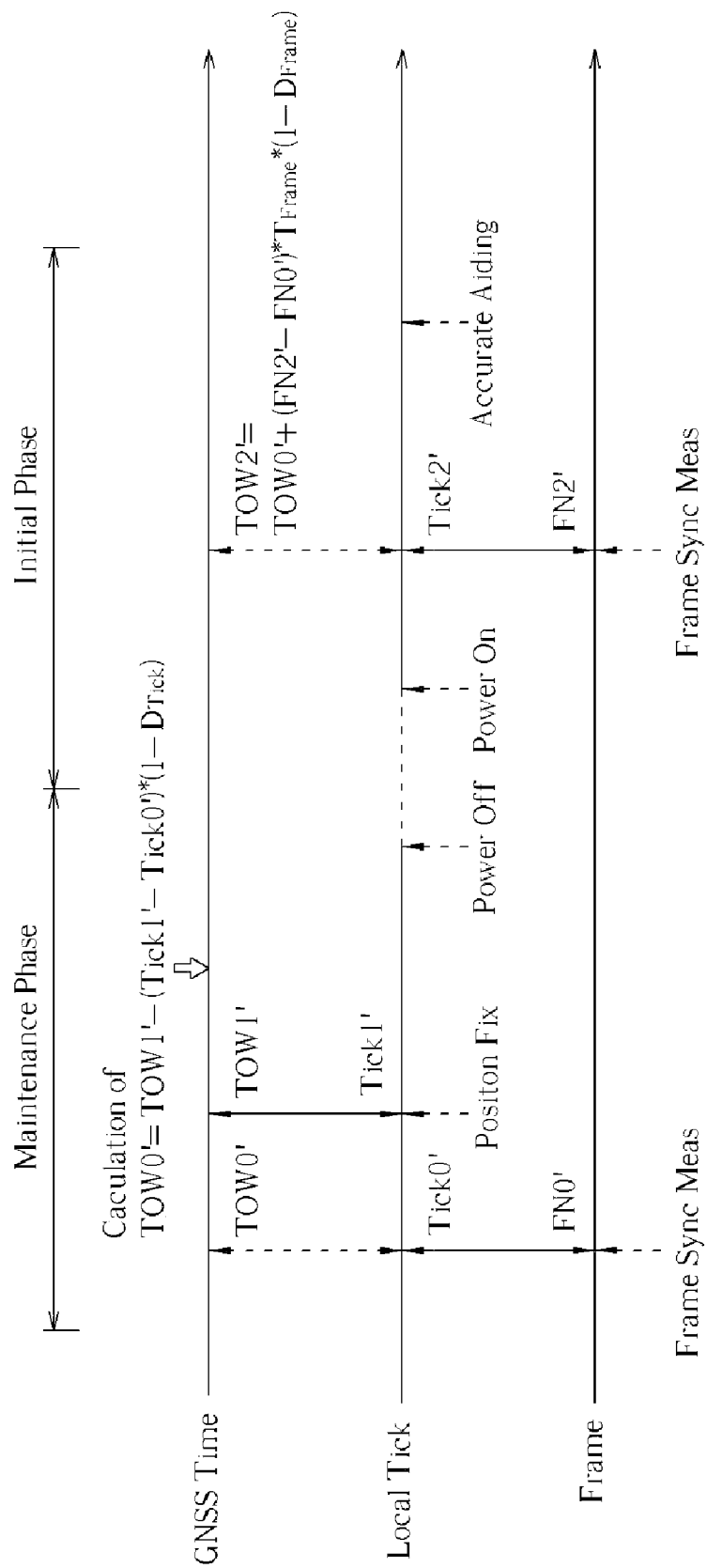
FIG. 3 illustrates a method for obtaining GNSS time in a GNSS receiver according to a variation of the embodiment shown in FIG. 2.

In addition, the order of operations performed before the power-off period as shown in FIG. 2 is for illustrative purposes only, and is not meant to be a limitation of the present invention. According to a variation of this embodiment, the order of operations performed before the power-off period can be varied as shown in FIG. 3. In this variation, values such as TOW0', TOW1', TOW2', Tick0', Tick1', Tick2', and FN2' are similar to the aforementioned values TOW0, TOW1, TOW2, Tick0, Tick1, Tick2, and FN2 shown in FIG. 2, where FN0' represents the frame number corresponding to TOW0' and Tick0'. The calculation of TOW0' is performed after TOW1' is obtained. Similar descriptions for this variation are not repeated in detail here.

Figure 4:
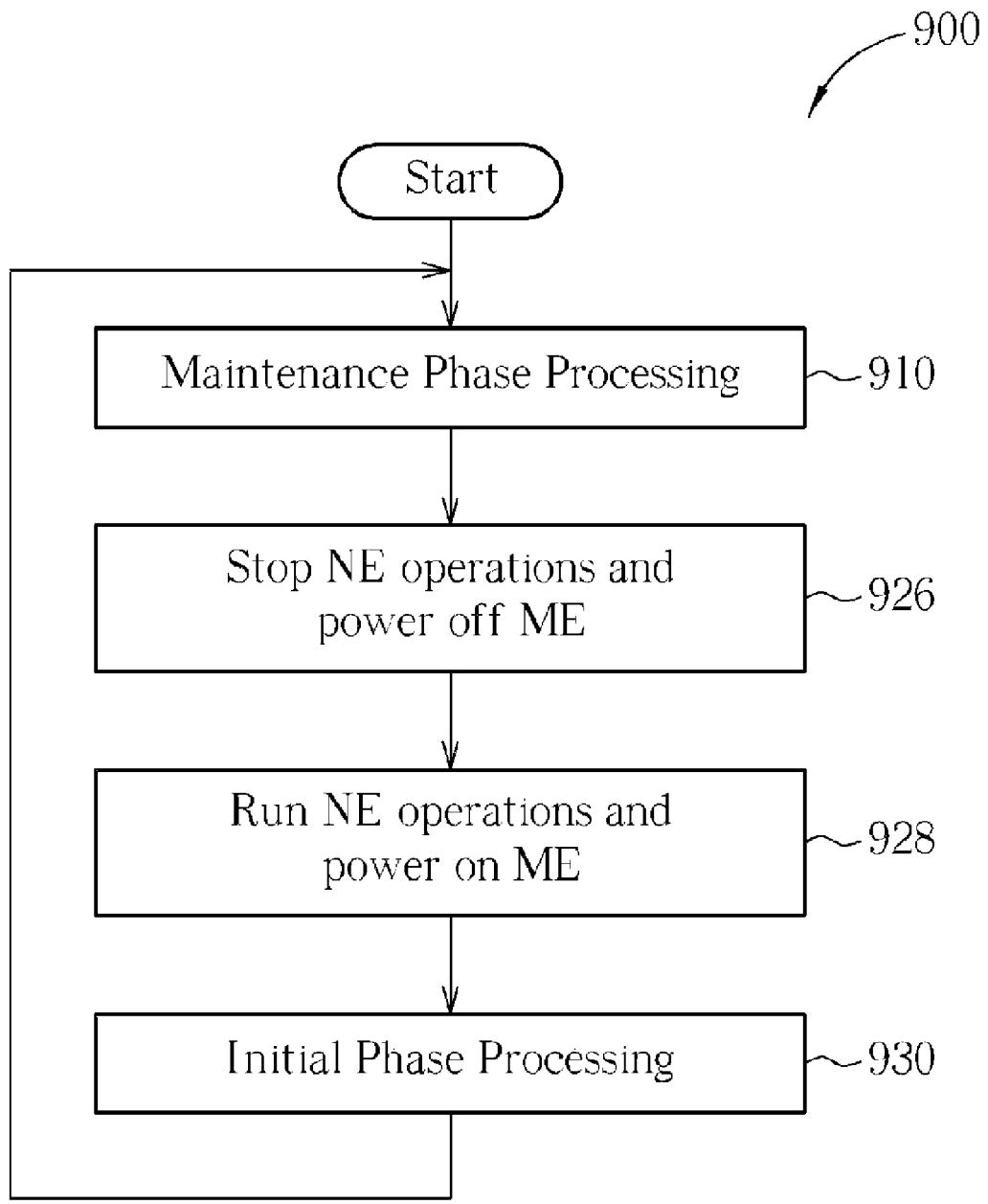
FIG. 4 is an exemplarily flowchart of the method shown in FIG. 2.

FIG. 4 is an exemplarily flowchart of the method shown in FIG. 2. In Step 910, maintenance phase processing corresponding to the operations of the maintenance phase mentioned above is performed. In Step 926, NE operations (i.e. the operations of the navigation engine 114) are stopped, and the ME (i.e. the measurement engine 120) is powered off. In Step 928, NE operations (i.e. the operations of the navigation engine 114) are run, and the ME (i.e. the measurement engine 120) is powered on. In Step 930, initial phase processing corresponding to the operations of the initial phase mentioned above is performed.

Figure 5:
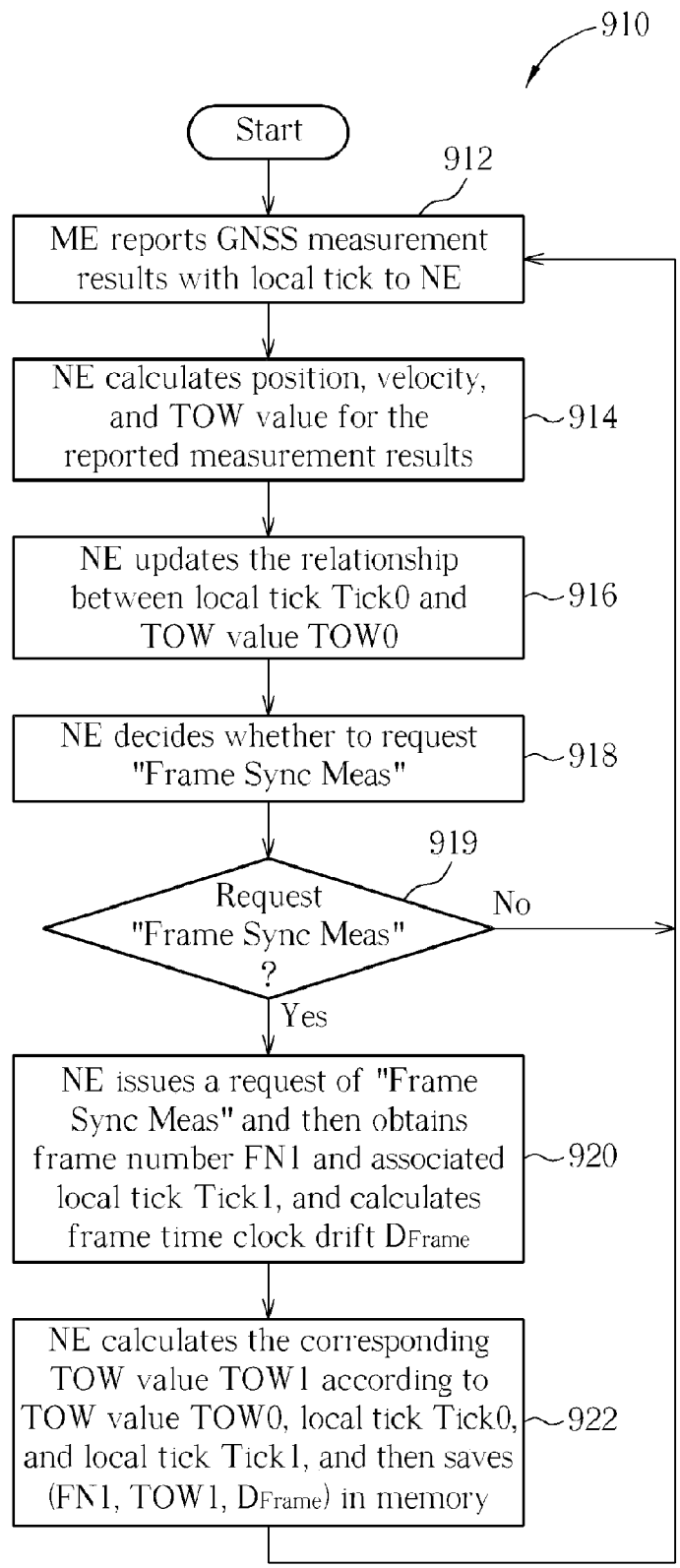
FIG. 5 is a flowchart of a first procedure of the method shown in FIG. 2, where the first procedure corresponds to a first time period that ends at a power-off time point shown in FIG. 2.

FIG. 5 illustrates a flowchart of a first procedure of the method shown in FIG. 2, where the first procedure corresponds to a first time period that ends at a power-off time point shown in FIG. 2. In this embodiment, the first procedure represents the maintenance phase processing of Step 910, and is described as follows.

In Step 912, the ME (i.e. the measurement engine 120) reports GNSS measurement results with the local tick to the NE (i.e. the navigation engine 114).

In Step 914, the NE calculates so-called PVT parameters, such as the position, the velocity, and the TOW value, for the reported measurement results.

In Step 916, the NE updates the time relationship between the local tick value Tick0 and the TOW value TOW0.

In Step 918, the NE decides whether to request "Frame Sync Meas" (i.e. the frame synchronization measurement mentioned above).

In Step 919, if it is determined to request "Frame Sync Meas", Step 920 is entered; otherwise, Step 912 is re-entered.

In Step 920, the NE issues a request of "Frame Sync Meas" and then obtains the frame number FN1 and the associated local tick value Tick1, and calculates the frame time clock drift $D_{Frame}$.

In Step 922, the NE calculates the corresponding TOW value TOW1 according to the TOW value TOW0, the local tick value Tick0, and the local tick value Tick1 as mentioned above, and then saves (FN1, TOW1, $D_{Frame}$) in the memory 116. After the operations of Step 922 are executed, Step 912 is re-entered as long as it is not triggered (manually or automatically) to enter Step 926.

Figure 6:
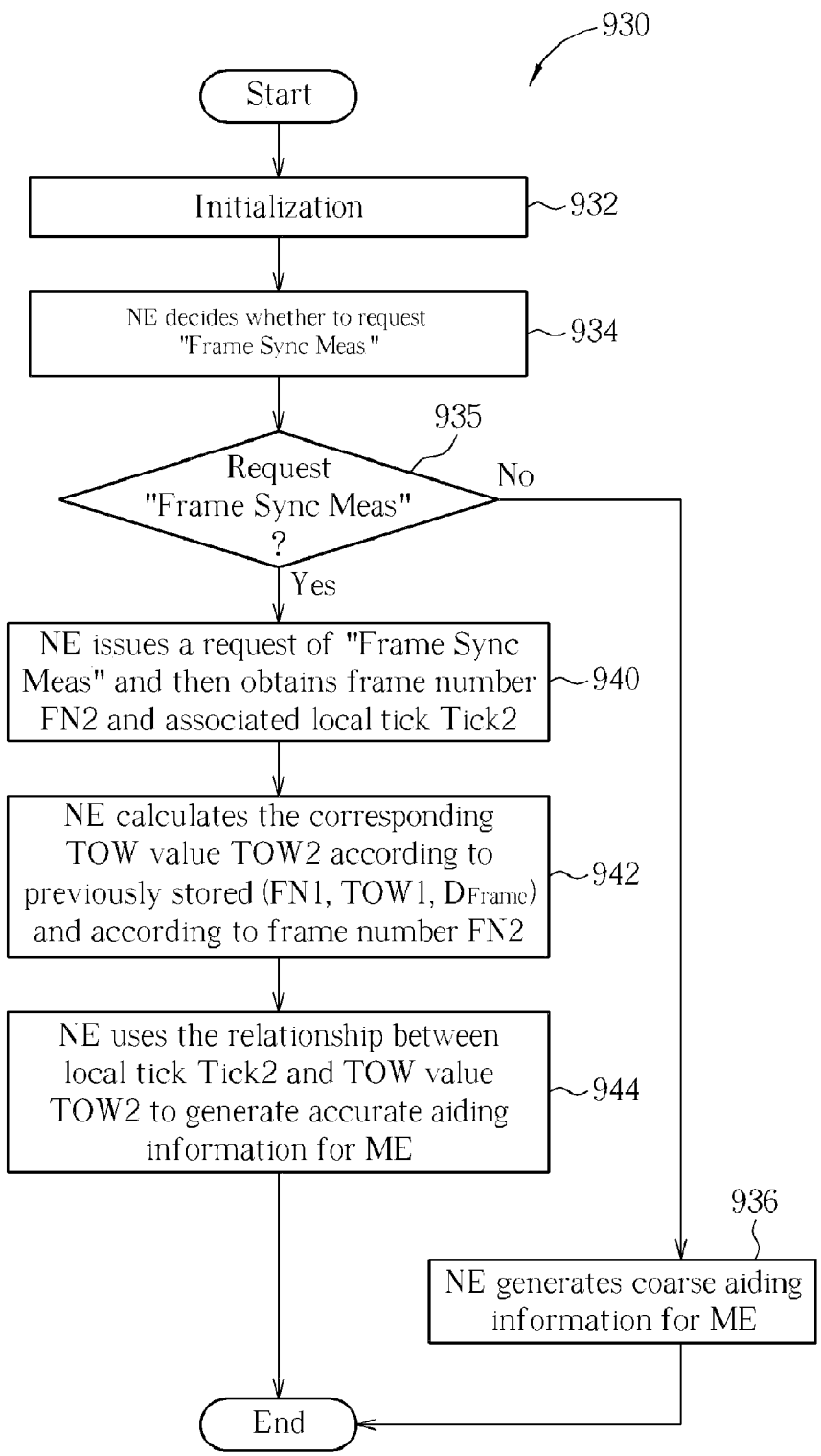
FIG. 6 is a flowchart of a second procedure of the method shown in FIG. 2, where the second procedure corresponds to a second time period that starts from a power on time point shown in FIG. 2.

FIG. 6 illustrates a flowchart of a second procedure of the method shown in FIG. 2, where the second procedure corresponds to a second time period that starts from a power on time point shown in FIG. 2. In this embodiment, the second procedure represents the initial phase processing of Step 930, and is described as follows.

In Step 932, initialization is performed.

In Step 934, the NE decides whether to request "Frame Sync Meas" (i.e. the frame synchronization measurement mentioned above).

In Step 935, if it is determined to request "Frame Sync Meas", Step 940 is entered; otherwise, Step 936 is entered.

In Step 936, the NE generates coarse aiding information for the ME.

In Step 940, the NE issues a request of "Frame Sync Meas" and then obtains the frame number FN2 and the associated local tick value Tick2.

In Step 942, the NE calculates the corresponding TOW value TOW2 according to the previously stored values (FN1, TOW1, $D_{Frame}$) and according to the frame number FN2 as mentioned above.

In Step 944, the NE uses the time relationship between local tick value Tick2 and the TOW value TOW2 to generate aiding information for the ME.

Figure 7:
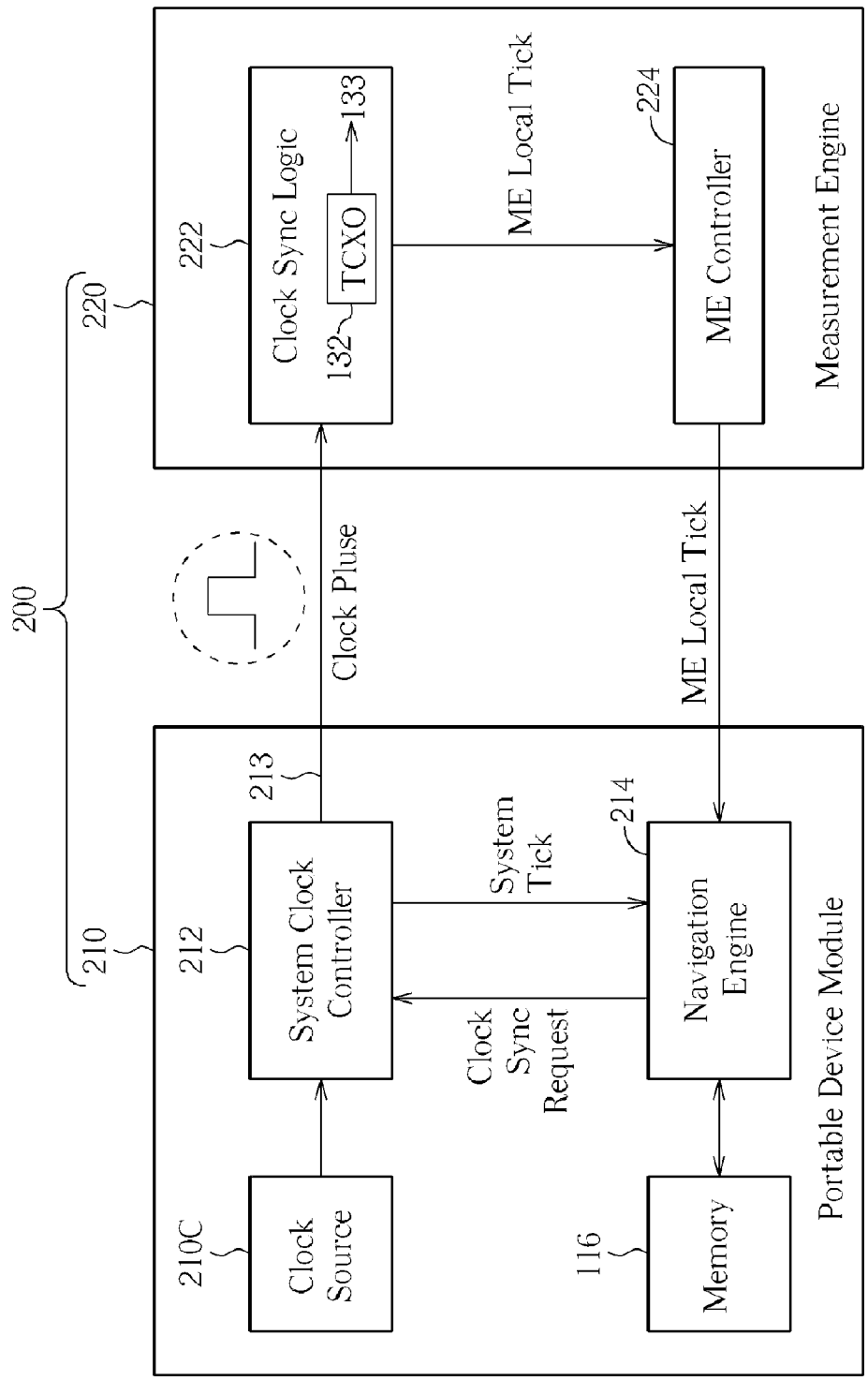
FIG. 7 is a diagram of an apparatus for obtaining GNSS time in a GNSS receiver according to a second embodiment of the present invention.

FIG. 7 is a diagram of an apparatus 200 for obtaining GNSS time in a GNSS receiver according to a second embodiment of the present invention. The second embodiment is a variation of the first embodiment, where differences between the second embodiment and the first embodiment are described as follows.

The cellular phone module 110 and the measurement engine 120 mentioned above are respectively replaced with a portable device module 210 and a measurement engine 220 since at least a portion of the processing modules are changed. The portable device module 210 is arranged to perform portable device operations, while the measurement engine 220 is arranged to perform measurement such as synchronization measurement (e.g. clock synchronization measurement).

The frame pulse controller 112 mentioned above is replaced with a system clock controller 212, and the second clock signal 113 mentioned above is replaced with a second clock signal 213. More particularly, under the control of the system clock controller 212, the second clock signal 213 is derived from a clock source 210C representing a system clock (e.g. the system clock of the apparatus 200), where the second clock signal 213 carries at least one clock pulse. In response to the changes mentioned above, the frame synchronization logic circuit 122 is replaced with a clock synchronization logic circuit 222 (labeled "Clock Sync Logic") since the synchronization measurement is performed according to the clock pulses instead of the frame pulses. Please note that the synchronization measurement performed at the first time point represents clock synchronization measurement, and the synchronization measurement performed at the second time point represents clock synchronization measurement.

In response to this, the navigation engine 114 and the measurement engine controller 124 are respectively replaced with their varied versions, i.e. the navigation engine 214 and the measurement engine controller 224 (labeled "ME controller"), respectively. In addition, the frame synchronization request (labeled "Frame Sync Request", i.e. the aforementioned request of "Frame Sync Meas") is replaced with a clock synchronization request (labeled "Clock Sync Request", i.e. a request of the clock synchronization measurement). Additionally, the frame number (e.g. FN1 or FN2) from the frame pulse controller 112 to the navigation engine 114 is replaced with a system tick value (labeled "System Tick") of the system clock mentioned above. Similar descriptions for this embodiment are not repeated in detail here.

Figure 8:
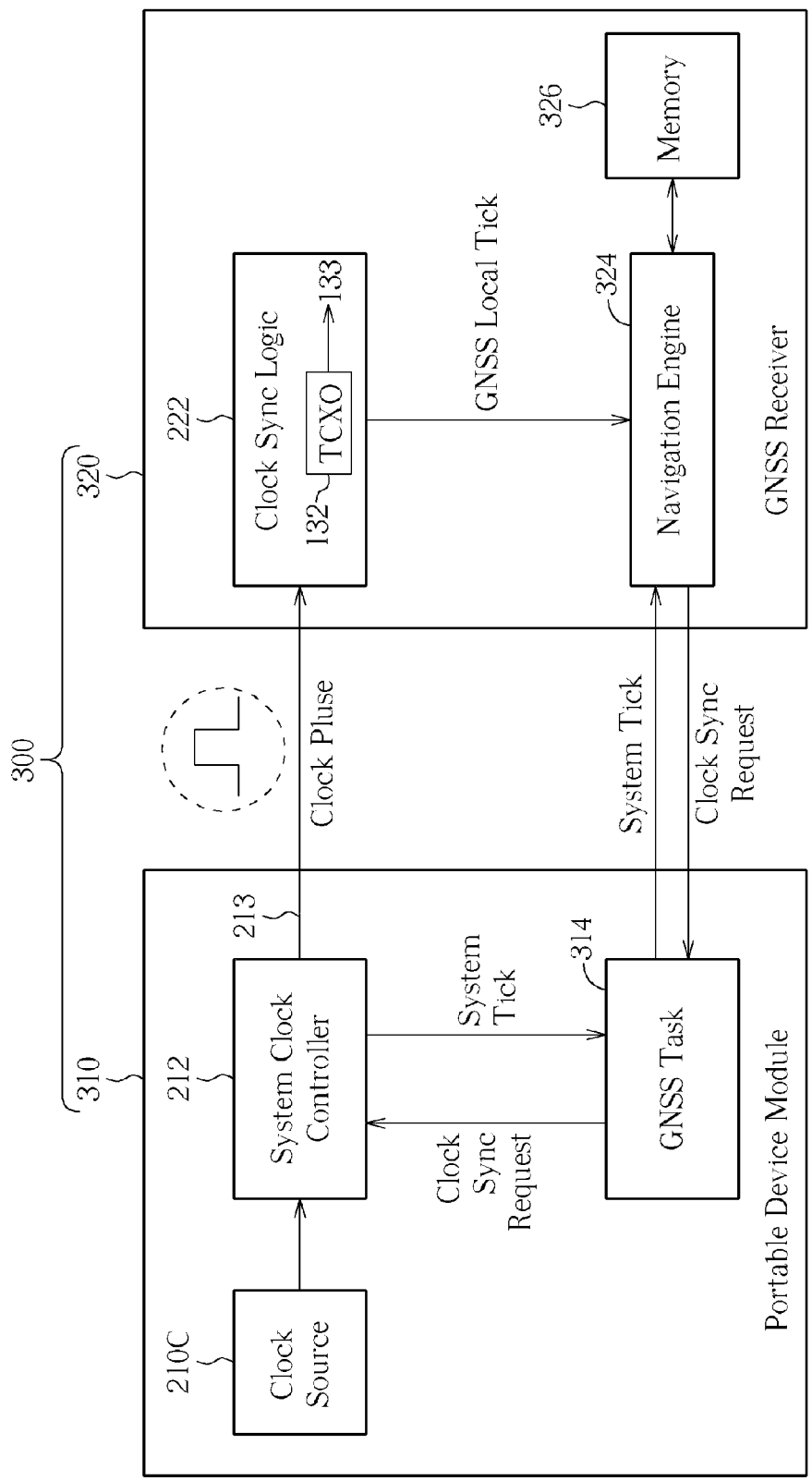
FIG. 8 is a diagram of an apparatus for obtaining GNSS time in a GNSS receiver according to a third embodiment of the present invention.

FIG. 8 is a diagram of an apparatus 300 for obtaining GNSS time in a GNSS receiver according to a third embodiment of the present invention. The third embodiment is a variation of the second embodiment, and is also a variation of the first embodiment, where differences between the third embodiment and the second embodiment are described as follows.

The portable device module 210 and the measurement engine 220 mentioned above are respectively replaced with a portable device module 310 and a GNSS receiver 320 since at least a portion of the processing modules are changed. The portable device module 310 is arranged to perform portable device operations such as those mentioned above, while most of GNSS receiver operations are implemented within the GNSS receiver 320.

More particularly, the navigation engine 214 and the associated memory 116 are respectively implemented as a navigation engine 324 and an associated memory 326 within the GNSS receiver 320. In response to this, the ME local tick is referred to as the GNSS local tick, and a GNSS task module 314 (labeled "GNSS Task") is arranged to transmit the clock synchronization request (labeled "Clock Sync Request") and the system tick value (labeled "System Tick") between the system clock controller 212 and the navigation engine 324.

In this embodiment, the GNSS task module 314 is a software module executed by an MPU in the portable device module 310. This is for illustrative purposes only, and is not meant to be a limitation of the present invention. According to a variation of this embodiment, the GNSS task module 314 is implemented with a controller executing a hardware code embedded within the controller. According to another variation of this embodiment, the GNSS task module 314 is implemented with an MCU executing a firmware code. Similar descriptions for this embodiment are not repeated in detail here.

Please note that, in practice, the frame number or the system tick mentioned above can be implemented with integer values. This is for illustrative purposes only, and is not meant to be a limitation of the present invention. According to some embodiments of the present invention, the frame number or the system tick mentioned above can be implemented with floating point values.

In addition, the abovementioned embodiments or variations can be modified in order to implement the present invention with a pure software solution or a pure hardware solution according to different embodiments of the present invention.

In contrast to the related art, the present invention methods and apparatus have no leap second issue since the calculations according to the above embodiments are based on the frame pulses carried by the clock signal 113 or the clock pulses carried by the clock signal 213, rather than utilization of the RTC time.

It is another advantage of the present invention that the present invention methods and apparatus utilize the synchronization measurement (e.g. the frame synchronization measurement or the clock synchronization measurement) to recover an accurate initial value of the GNSS time after a power-off period with high resolution, where the typical error of the initial value of the GNSS time is typically below the microsecond level when the power-off period is short.

It is another advantage of the present invention that the present invention methods and apparatus help subframe synchronization. As a result, when the GNSS receiver starts up, the Time To First Fix (TTFF) can be greatly reduced in contrast to the related art.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for obtaining Global navigation Satellite System (GNSS) time in a GNSS receiver, the method comprising:
    obtaining a time relationship between a first clock signal and the received GNSS time;
    obtaining a first clock value of a second clock signal and further obtaining a first associated clock value of the first clock signal at a first time point;
    calculating a first GNSS time corresponding to the first clock value of the second clock signal according to the first associated clock value of the first clock signal and the time relationship;
    obtaining a second clock value of the second clock signal and further obtaining a second associated clock value of the first clock signal at a second time point; and
    calculating a second GNSS time corresponding to the second associated value of the first clock signal at the second time point, according to the first GNSS time, the first clock value of the second clock signal, and the second clock value of the second clock signal.

2. The method of claim 1 further comprising:
    controlling at least a portion of the GNSS receiver to enter a power saving mode during a time period between the first time point and the second time point.

3. The method of claim 1, wherein the time relationship between the first clock signal and the GNSS time represents value mapping between the clock value of the first clock signal and the GNSS time.

4. The method of claim 1 further comprising:
    performing synchronization measurement at the first time point to obtain the first associated clock value of the first clock signal and the first clock value of the second clock signal;
    performing synchronization measurement at the second time point to obtain the second associated clock value of the first clock signal and the second clock value of the second clock signal.

5. The method of claim 4, wherein the second clock signal is synchronized with a frame time clock of a cellular network; the synchronization measurement performed at the first time point represents frame synchronization measurement, and first clock value of the second clock represents a frame number FN1; and the synchronization measurement performed at the second time point represents frame synchronization measurement, and the second clock value of the second clock represents a frame number FN2.

6. The method of claim 5, further comprising:
    calculating the second GNSS time by the following equation:

$$C2 = C1 + (FN2 - FN1) * T_{Frame} * (1 - D_{Frame});$$

wherein C1 represents the first GNSS time, C2 represents the second GNSS time, the $T_{Frame}$ represents a length of a frame cycle of the frame time clock, and the $D_{Frame}$ represents a frame time clock drift of the frame time clock.

7. The method of claim 6, further comprising:
before the step of calculating the second GNSS time, updating $D_{Frame}$, wherein $D_{Frame}$ represents a frame time clock drift of the frame time clock.

8. The method of claim 5, further comprising:
calculating the second GNSS time according to a frame time clock drift of the frame time clock, the first GNSS time, the frame number FN1, and the frame number FN2.

9. The method of claim 4, wherein the second clock signal is derived from a clock source representing a system cock; the synchronization measurement performed at the first time point represents clock synchronization measurement; and the synchronization measurement performed at the second time point represents clock synchronization measurement.

10. The method of claim 1, wherein the step of obtaining the first clock value of the second clock signal and further obtaining the first associated clock value of the first clock signal comprises:
utilizing the first clock signal to measure arrival time of a pulse corresponding to the second clock value of the second clock time in order to obtain the first associated clock value;
wherein the step of obtaining the second clock value of the second clock signal and further obtaining the second associated clock value of the first clock signal further comprises:
utilizing the first clock signal to measure arrival time of a pulse corresponding to a second clock value o the second clock time in order to obtain the second associated clock value.

11. A method for obtaining Global navigation Satellite System (GNSS) time in a GNSS receiver, the method comprising:
receiving a first frame number of a frame time clock of a cellular network at a first time point;
obtaining a first GNSS time corresponding to the first frame number;
receiving a second frame number of the frame time clock at a second time point; and
obtaining a second GNSS time corresponding to an associated clock value of a clock signal of the GNSS receiver, according to the first GNSS time, the first frame number, and the second frame number.

12. The method of claim 11 further comprising:
controlling at least a portion of the GNSS receiver to enter a power saving mode during a time period between the first time point and the second time point.

13. The method of claim 11, further comprising:
calculating the second GNSS time by the following equation:

$$C2=C1+(FN2-FN1)*T_{Frame}*(1-D_{Frame});$$

wherein C1 represents the first GNSS time, C2 represents the second GNSS time, the $T_{Frame}$ represents a length of a frame cycle of the frame time clock, and the $D_{Frame}$ represents a frame time clock drift of the frame time clock.

14. The method of claim 13, further comprising:
before the step of calculating the second GNSS time, updating the value of $D_{Frame}$.

15. The method of claim 11, further comprising:
calculating the second GNSS time according to a frame time clock drift of the frame time clock, the first GNSS time, the frame number FN1, and the frame number FN2.

16. An apparatus for obtaining Global navigation Satellite System (GNSS) time in a GNSS receiver, the apparatus comprising:
at least one processing module arranged to receive a first frame number of a frame time clock of a cellular network at a first time point, obtain a first GNSS time corresponding to the first frame number, receive a second frame number of the frame time clock at a second time point, and obtain a second GNSS time corresponding to an associated clock value of a clock signal of the GNSS receiver according to the first GNSS time, the first frame number, and the second frame number.

17. The apparatus of claim 16, wherein one of the at least processing module controls at least a portion of the GNSS receiver to enter a power saving mode during a time period between the first time point and the second time point.

18. The apparatus of claim 16, wherein one of the at least one processing module calculates the second GNSS time by the following equation:

$$C2=C1+(FN2-FN1)*T_{Frame}*(1-D_{Frame});$$

wherein C1 represents the first GNSS time, C2 represents the second GNSS time, the $T_{Frame}$ represents a length of a frame cycle of the frame time clock, and the $D_{Frame}$ represents a frame time clock drift of the frame time clock.

19. The apparatus of claim 18, before calculating the second GNSS time, one of the at least one processing module updates the value of $D_{Frame}$.

20. The apparatus of claim 16, wherein one of the at least one processing modules calculates the second GNSS time according to a frame time clock drift of the frame time clock, the first GNSS time, the frame number FN1 and the frame number FN2.

* * * * *